Jan. 15, 1924.
L. GROSSMANN
1,480,885
RAILROAD SAFETY BOLT LOCK
Original Filed April 15, 1922
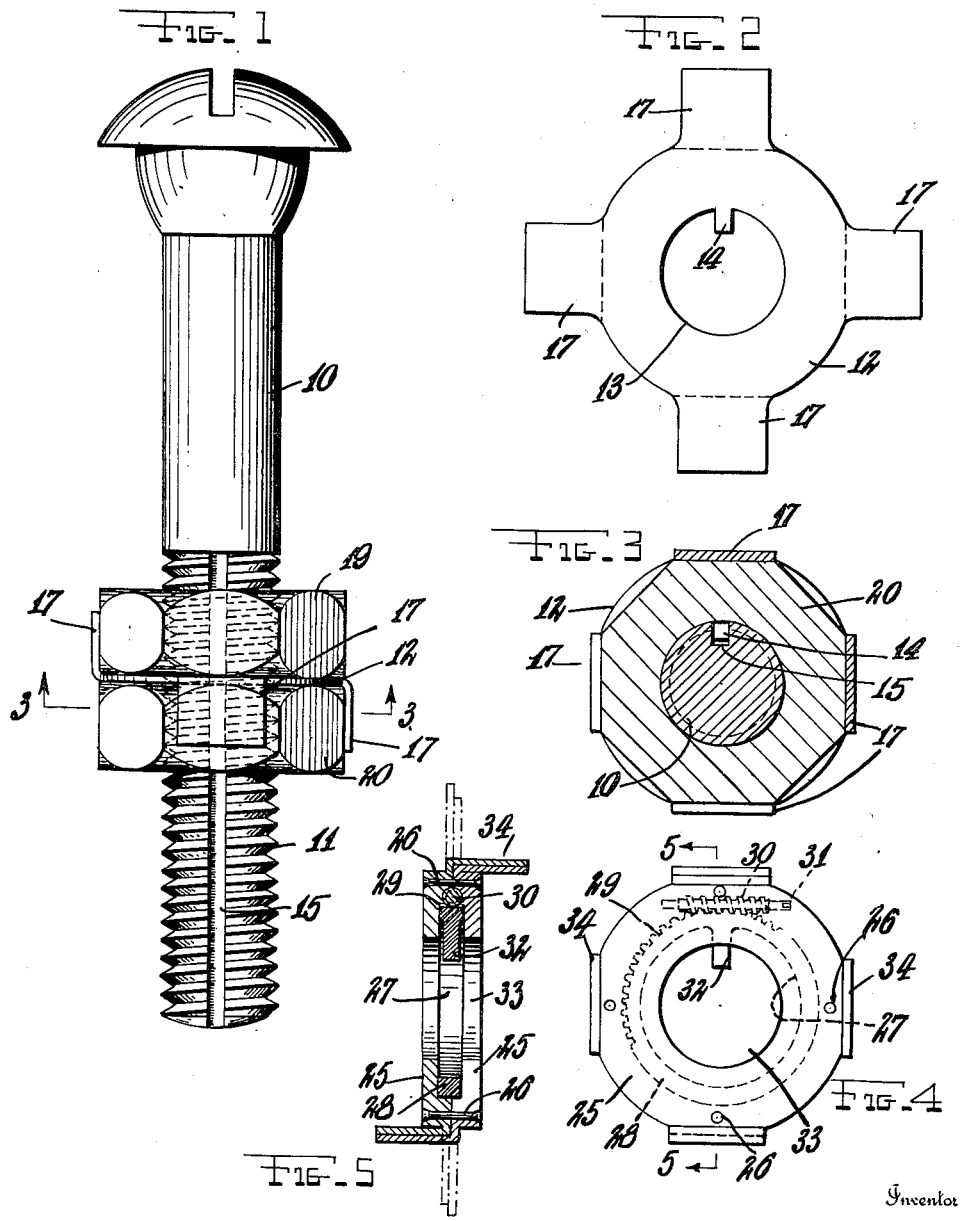
Inventor
Ludwig Grossmann
By
Attorney Patented Jan. 15, 1924.

1,480,885

UNITED STATES PATENT OFFICE.

LUDWIG GROSSMANN, OF CAMDEN, NEW JERSEY.

RAILROAD SAFETY BOLT LOCK.

Application filed April 15, 1922, Serial No. 553,178. Renewed December 6, 1923.

*To all whom it may concern:*

Be it known, that I, LUDWIG GROSSMANN, citizen of the United States residing at Camden, in the county of Camden and State of New Jersey, have invented certain new and useful Improvements in Railroad Safety Bolt Locks, filed on April 15, 1922, under Serial No. 553,178, of which the following is a specification:

This invention relates to nut-locks having for an object the provision of a simple and inexpensive form of nut-lock which acts to securely lock the nut to its bolt and which permits of the ready removal of the nut when desired.

For further comprehension of the invention, and of the objects and advantages thereof, reference will be had to the following description and accompanying drawings, and to the appended claims in which the various novel features of the invention are more particularly set forth.

Fig. 1 of the drawings is a side elevational view showing a nut locked on a bolt by means of my improved nut-lock.

Fig. 2 is a detail face view of the nut-lock blank.

Fig. 3 is a horizontal section on the line 3—3 of Fig. 1.

Fig. 4 is a face view of a modified form of nut-lock.

Fig. 5 is a transverse sectional view on the line 5—5 of Fig. 4, showing the locking elements in folded position.

In the drawings the reference numeral 10 indicates a bolt of ordinary construction and having screw-threads 11. My improved nut-lock is shown in detail in Fig 2 and comprises a comparatively thin disk or washer 12 having an opening 13 therein to receive the bolt. The wall of this opening is formed with an inwardly projecting lug 14 which is adapted to engage freely in a longitudinal groove 15 in the bolt to hold the disk against rotation on the latter.

This disk is formed with nut-engaging elements comprising the integral ears 17 projecting from the edge thereof, there being preferably four of these ears spaced equally around the disk. This nut-lock is preferably employed in conjunction with a pair of nuts as indicated in Fig 1. One of nuts 19, is first screwed on the bolt 10 against the object to be held. The disk 12 is then placed on the bolt in engagement with the rear face of the latter, the lug 14 being engaged in the groove 15. The other nut 20, is then screwed against the disk 12, after which one pair of the ears 17 is bent forwardly to engage opposed sides of the nut 19, and the other pair is bent rearwardly to engage opposed sides of the nut 20. The nuts are thus held against rotation by the disk 12 which is locked to the bolt by the lug 14.

In Figs. 4 and 5 I have shown a modified form of nut-lock which permits of rotary shifting of the nut engaging ears with respect to the bolt engaging lug. In this construction the nut-lock comprises a compound disk consisting of a pair of disks 25 in facial contact and secured together as by rivets 26, the contacting faces being correspondingly recessed to form an interior circular chamber 27. In this chamber is rotatably held a ring 28 having worm teeth 29 extending partly around the periphery thereof. Suitably journaled in the nut-lock is a worm pinion 30 whose shank is formed at one end with a socket 31 adapted to receive an adjusting tool. Formed on the inner side of the ring 28 is a lug 32 projecting partly across the aperture 33 of the compound disk and adapted to engage in the groove 15 in the bolt 10. The nut engaging elements are in the form of ears 34 projecting from the disks 25.

In the use of this form of the nut-lock the nut 19 is screwed home and the nut-lock placed behind it. If the ears 34 are not in proper registry with the sides of the nut the worm pinion 30 is rotated until the proper registry is obtained, the ears being then bent to engage the nuts. The nut-lock might also be used with a single nut by placing it in front of the latter.

Having thus described my invention what I claim as new and desire to protect by Letters Patent of the United States is as follows:

1. A nut-lock comprising an apertured disk having a lug on the wall of its aperture adapted to engage in a groove in a bolt, and an ear on its edge adapted to be bent into contact with a side of a nut, and means for rotatively varying the positions of the said lug and ear.

2. A nut-lock comprising an apertured disk arranged to present an interior chamber, a ring rotatable in said chamber, a pair of opposed ears on said disk adapted to engage opposed sides of a nut, an inturned lug on said ring adapted to engage in a groove in a nut, and means for adjusting said ring to different rotative positions in said chamber.

3. A nut-lock comprising an apertured disk arranged to present an interior chamber, a ring rotatable in said chamber, a pair of opposed ears on said disk adapted to engage opposed sides of a nut, an inturned lug on said ring adapted to engage in a groove in a nut, and means for adjusting said ring to different rotative positions in said chamber, said means comprising a worm pinion journaled in said disk and engaging worm teeth formed on said ring.

4. A nut-lock comprising a pair of disks secured together in facial contact and recessed to form an interior chamber, ears on said disks, a ring rotatable in said chamber, an inturned lug on said ring, worm teeth on said ring, and a pinion engaging said worm teeth.

In testimony whereof I have affixed my signature.

LUDWIG GROSSMANN.